July 8, 1958     P. M. TURKHEIMER     2,842,617
METHOD AND APPARATUS FOR GENERATING PHASING PULSES
Filed Dec. 27, 1955
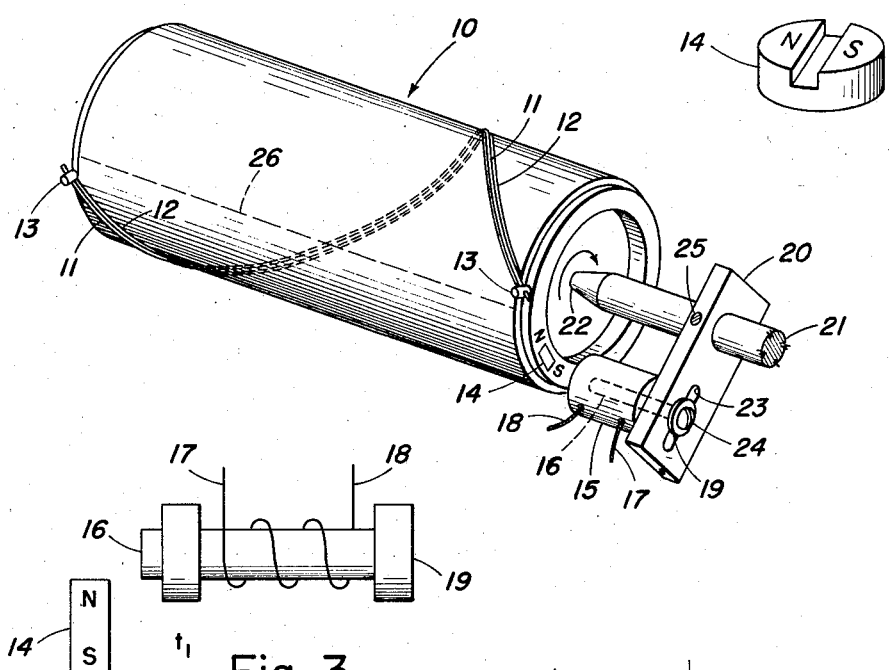
Fig. 1.
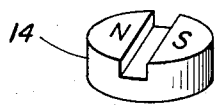
Fig. 2.
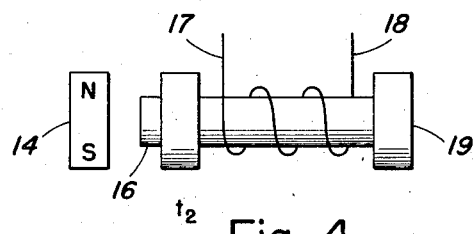
Fig. 3.
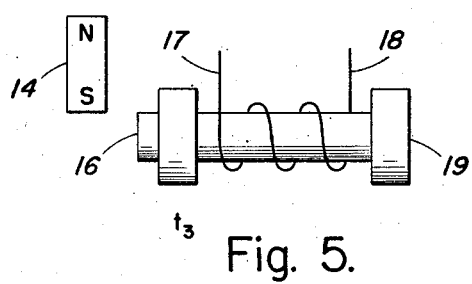
Fig. 4.
Fig. 5.
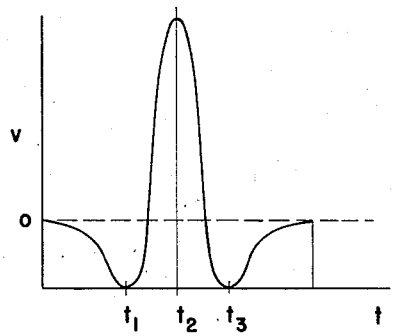
Fig. 6.
INVENTOR.
Paul M. Turkheimer
BY Charles J. Elderkin
ATTORNEY United States Patent Office 2,842,617
Patented July 8, 1958

2,842,617

METHOD AND APPARATUS FOR GENERATING PHASING PULSES

Paul M. Turkheimer, Little Falls, N. J., assignor to Air Associates, Incorporated, Teterboro, N. J.

Application December 27, 1955, Serial No. 555,548

4 Claims. (Cl. 178—69.5)

The present invention relates to a method for generating electrical signals of a desired shape. More particularly, the invention contemplates the provision of a magnetic pulse generator for use in facsimile communications systems, and the like, which is capable of producing electrical pulses of waveform providing combined triggering impetus for a multivibrator or similar electronic circuit and phase marking with blanking.

In numerous electromechanical systems it is necessary to provide an electrical impulse corresponding in time sequence to a specific reference phase on a rotating member. In prior arrangements of this general type, the necessary phase signalling is usually obtained by the expedient of a cam mounted on the rotating member which is adapted to actuate a contact connected in circuit with a source of potential to produce the required pulse. The components of such a system are subject to considerable wear and are not readily adjustable under actual operating conditions.

It is the principal object of the present invention to provide a pulse generator for use in facsimile communications systems and similar systems, wherein the pulse produced may be used without further shaping to trigger a so-called "one-shot" or monostable multivibrator or similar electronic circuit to provide phase marking, and wherein the pulse produced has waveform components capable of providing blanking for the system.

It is a further object of the invention to provide a pulse generator of the general class described which eliminates completely the replacement factor associated with electro-mechanical phasing systems heretofore employed by industry through elimination of all mechanical contact requirements, and wherein phasing adjustments may be made under actual operating conditions, i. e., while the equipment is running, with provision for varying both the amplitude and time sequence of the output pulse.

While the pulse generator of the invention may be employed in a great many electromechanical systems, for purposes of illustration alone a specific embodiment will be described hereinafter showing the application of the generator to a facsimile communications system. The above as well as other features and objects of the invention may be best understood by reference to such description taken in conjunction with the accompanying drawings, wherein:

Fig. 1 is a perspective view of the rotating recording drum of a facsimile system showing the components of the phaser of the invention in operative relationship with respect thereto;

Fig. 2 is a perspective view of a modified form of permanent magnet which may be employed in the phaser of the invention;

Figs. 3, 4 and 5 are time sequence schematic views of the phaser system illustrated in Fig. 1 showing the relative positioning of the permanent magnet and electromagnetic winding thereof during rotation of the recording drum; and Fig. 6 is a curve of the output pulse generated by the phaser of the invention on each revolution of the recording drum having reference to the schematic time sequence study of Figs. 3, 4 and 5.

In general, the invention provides a method for generating output electrical pulses of relatively short duration having a central relatively high amplitude component (phasing) in one electrical direction, and symmetrical side components of relatively reduced amplitude in the opposite electrical direction (blanking). The pulses are obtained by positioning a permanent magnet at one end of a rotating member with respect to which phasing of a system is to be determined, such as the recording drum of a facsimile receiver, with the magnetic poles of the permanent magnet being spaced apart within the path of rotation of the member. An electromagnetic winding or coil is adjustably positioned in magnetic field proximity with respect to the permanent magnet and within the path of rotation of the magnet, having its axis or core positioned normal to the plane of rotation of the magnet, such that an electrical pulse is developed across the electromagnetic winding for each complete rotation of the rotating member due to the rate of change in magnitude and polarity of magnetic flux of the permanent magnet cutting the winding or coil.

Referring specifically to the embodiment of the invention illustrated in the drawings, and, in particular, Fig. 1 thereof, there is shown a conventional facsimile recorder drum 10 of the so-called "lawnmower" scanner type carrying a helical electrode 11 mounted thereon within a resilient insert 12 of rubber or similar substance, with the ends of the electrode being anchored by suitable tensioning supports 13 provided at each end of drum 10, all in conventional manner. Electrode 11 is adapted to cooperate with a fixed linear electrode (not shown) upon rotation of drum 10 to produce marking on sensitized paper passed between the electrodes and under action of signals from a facsimile scanner applied to the electrode system, also in conventional manner.

The magnetic pulse generator or electromagnetic phaser of the invention, as illustrated in Fig. 1, consists of a permanent magnet 14 which is mounted on a shoulder 15 provided at one end of drum 10 and extending beyond the recording surface of the drum. Permanent magnet 14 may be a simple bar magnet as illustrated in Fig. 1 or it may be of any other suitable configuration such as the disk-type horseshoe magnet illustrated in Fig. 2 of the drawing. The permanent magnet is mounted near the periphery of drum 10 so as to present one magnetic pole in the direction of rotation of the drum (north pole in the embodiment of Fig. 1) and its other magnetic pole in the opposite direction (south pole in Fig. 1).

In magnetic field proximity to the permanent magnet 14 there is positioned an electromagnetic coil or winding as designated by reference numeral 15 in Fig. 1, comprising a magnetic core 16 (dotted) of iron or similar material, and an electrical winding represented by the respective broken leads 17 and 18 in Fig. 1, which is maintained on the core 16 by suitable retainer washers or disks 19 (Figs. 3, 4 and 5), in conventional manner. In the embodiment of the invention shown in the drawings, the electromagnetic winding 15 is conveniently mounted on a bracket 20 suspended from shaft 21 which supports the recording drum 10, in that, shaft 21 is stationary and merely engages a conical type bearing 22 provided in the recording drum to permit rotation of the drum under action of suitable drive gearing (not shown) which is provided at the opposite end of the drum. Bracket 20 is slotted as shown at 23 to receive a set-screw 24 which engages the electromagnetic winding assembly 15, thereby permitting radial adjustment of the relative position of the electromagnetic winding with respect to the plane of revolution of permanent magnet 14 mounted on drum 10. A similar set-screw 25 is mounted within a tapped hole provided in the bracket 20 and is adapted to be threaded into forced contact against the surface of shaft 21, thereby locking the bracket and electromagnetic assembly in a fixed position on the shaft while providing for complete adjustability of the coil assembly with respect to the permanent magnet, as explained more fully hereinafter.

In operation, the poles of magnet 14 are drawn past the electromagnetic winding 15 with each revolution of recording drum 10 such that the axis or core of the electromagnetic winding is normal to the plane passing through both poles of the permanent magnet. In such manner, when rotation of drum 10 is such as to position the permanent magnet with respect to the electromagnetic winding approximately as shown in Fig. 3, or time $t_1$, the rate of change of magnetic flux cutting the windings is such as to generate across the windings a voltage magnitude and polarity equivalent to that shown at $t_1$ in the curve of Fig. 6 (blanking).

As rotation of drum 10, and, accordingly, permanent magnet 14 continues to approximately the relative positioning illustrated in Fig. 4 ($t_2$), the N-pole of the permanent magnet passes the core of the electromagnetic winding causing a sudden reversal of magnetic polarity. At this position, the rate of change of magnetic flux cutting the windings is a maximum and is such as to generate in the windings the pulse component of magnitude and polarity as shown at $t_2$ in the curve of Fig. 6 (phasing).

As the S-pole of the permanent magnet moves away from the windings due to continued rotation, as shown at time $t_3$ in Fig. 5, the rate of change of magnetic flux cutting the windings is such as to generate across the windings the pulse component of magnitude and polarity as shown at $t_3$ in the curve of Fig. 6 (blanking).

A pulse of identical waveform will be generated in the electromagnetic winding 15 for each rotation of the permanent magnet past the winding. If it is desired to obtain a narrow, large pulse for any specific application it is merely necessary to employ a permanent magnet having its poles spaced very close together, such as the horseshoe-type magnet shown in Fig. 2. Furthermore, the amplitude of the output pulse may be varied or adjusted while the system is in use by simply loosening set screw 25 and moving the winding assembly towards (increase) or away (decrease) from the plane of revolution of the permanent magnet, as indicated by the straight arrows on shaft 21 in Fig. 1.

It will be noted that the permanent magnet 14 is positioned approximately 120° from the recording drum idle position, or, that area on the recorder drum between the respective ends of helical electrode 11 as indicated by dotted line 26 in Fig. 1, and this relative positioning would ordinarily establish a fixed phasing relationship for the system. Since it is important that the time-phasing of the output pulse can be varied with respect to the recorder drum while the system is in operation, it will be readily appreciated that such a fixed-phase system would be virtually useless. The phaser of the present invention, however, can be adjusted while operating to provide so-called "dynamic phasing" by simply adjusting set-screw 25 and rotating or pivoting bracket 20 about shaft 21 as indicated by the curved arrow shown on bracket 20 in Fig. 1.

As may be seen by reference to the curve of Fig. 6, the waveform of the output pulse is such as to provide a central pulse component of maximum amplitude in one electrical direction ($t_2$), and symmetrical side components of moderate amplitude and opposite polarity or electrical direction ($t_1$ and $t_3$). A pulse of this configuration is ideally suited for use in facsimile systems wherein the central pulse component can be employed for phasing applications since it is of sufficient amplitude to trigger electronic phase marking circuits without external amplification or shaping, while the side components of the pulse can be employed to effect blanking in the system, i. e., to insure that no intelligence will be transmitted while the linear electrode is off the helical electrode, or, within the area designated by dotted line 26 in Fig. 1.

Having thus described the subject matter of my invention, what it is desired to secure by Letters Patent is:

I claim:

1. Apparatus for generating electrical pulses having waveform components capable of providing phase marking with blanking time in a system including a rotating member with respect to which phase marking is to be accomplished, that comprises, permanent magnet means mounted in a fixed position at one end of said rotating member with the respective poles thereof spaced apart in the direction of rotation of the member, and electromagnetic winding means positioned in magnetic field proximity to the plane of rotation of said permanent magnet means with the axis of said winding means normal to said plane.

2. In combination with a facsimile communication system employing a rotating member with respect to which phasing of the system is to be accomplished, apparatus for generating electrical pulses having waveform components capable of providing phase marking with blanking time that comprises, permanent magnet means mounted in a fixed position at one end of said rotating member with the respective poles thereof being spaced apart in the direction of rotation of said members, and electromagnetic winding means positioned in magnetic field proximity to the plane of rotation of said permanent magnet means with the axis of said winding being normal to said plane.

3. The apparatus as claimed in claim 2 and further comprising means for varying the amplitude of the generated electrical pulses during rotation of said rotating member.

4. In the phasing of an electro-mechanical system having a rotatable member with respect to which phasing is to be accomplished, the improvement that comprises mounting in a fixed position at one end of said rotatable member permanent magnet means positioned such that the respective poles thereof are spaced apart in the direction of rotation of said member, rotating said rotatable member, and positioning electromagnetic winding means in magnetic field proximity to the plane of rotation of said rotating permanent magnet means with the axis of said winding means normal to said plane, whereby a phasing pulse is generated across said electromagnetic winding means upon each rotation of said rotatable member.

References Cited in the file of this patent

UNITED STATES PATENTS

| | | |
|---|---|---|
| 2,403,059 | Dillenback | July 2, 1946 |
| 2,428,946 | Somers | Oct. 13, 1947 |
| 2,685,612 | Lansil | Aug. 3, 1954 |